M. B. Fraser.
Cheese-Press.
No. 80,158.   Patented July 21, 1868.
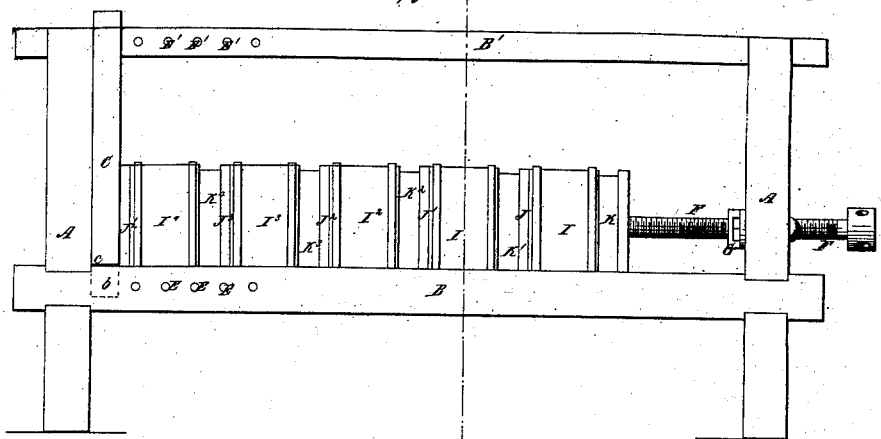
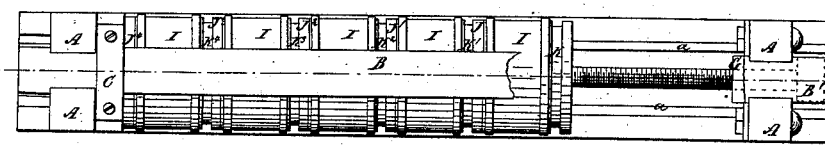
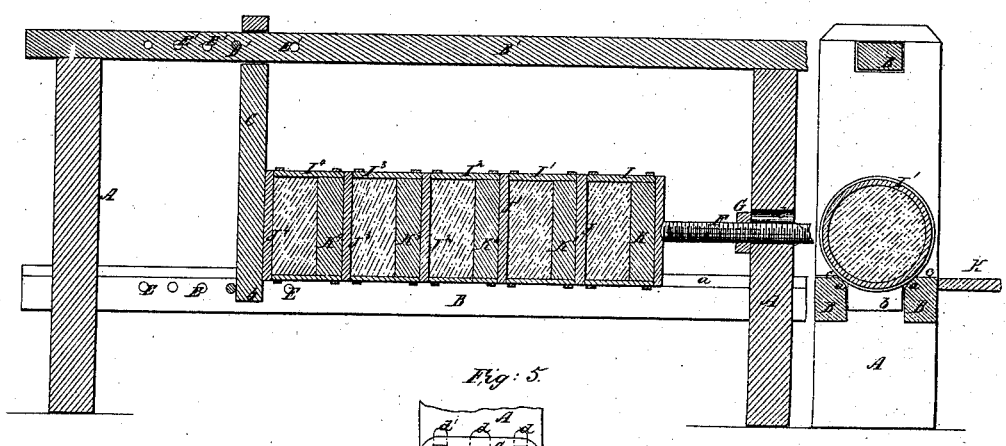
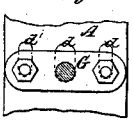
Witnesses:
R. S. Campbell
Edw. Schafer
Inventor:
Milton B. Fraser
by his agents
Mason, Fenwick & Lawrence

United States Patent Office.

MILTON B. FRASER, OF STEUBEN, NEW YORK.

Letters Patent No. 80,158, dated July 21, 1868.

IMPROVED CHEESE-PRESS.

*The Schedule referred to in these Letters Patent and making part of the same.*

TO ALL WHOM IT MAY CONCERN:

Be it known that I, MILTON B. FRASER, of Steuben, in the county of Oneida, and State of New York, have invented a new and useful Improvement in Cheese-Presses; and I do hereby declare that the following is a full, clear, and exact description of the same, reference being had to the accompanying drawings, forming part of this specification, in which—

Figure 1 is a side elevation of a cheese-press, showing my invention.

Figure 2 is a top view of the same, a portion of the frame being broken away.

Figure 3 is a longitudinal section of the press as it appears when a series of cheeses have been pressed in it, and before the cheeses are removed.

Figure 4 is a cross-section of the press.

Figure 5 is a detail view, showing the nut with its brackets and bolts, and the slots $d$ $d'$ $d'$.

Similar letters of reference in the several figures indicate corresponding parts.

The nature of my invention consists in employing a series of cheese-hoops or cylinders, each furnished with its own pressing-follower or plunger, between a foot-block and a screw, or other equivalent power-device, in such a manner that the pressure, which is applied to the first of the series of followers or plungers, is transmitted in the same line and at the same time to the whole series of plungers, and thus a greater number than one, or as many as ten (more or less) cheeses, pressed at one operation, and upon the same bed or frame, and by the one screw.

The principle of operation of my press is to transmit pressure in a direct line through a gang of cheeses, or, if desired, through a series of gangs, each gang having all its cheese-hoops in the same line, and the several gangs being furnished with followers, which are acted upon by one screw, whose head-block bears against the follower of the first hoop of each gang; or each gang having its own screw, and the several screws being geared together, so as to operate simultaneously when set in motion by a single shaft.

The general plan of my press is such that the pressing can be repeated after the length of the screw has been once run out, and to do this, provision is made for setting up the foot-block, and also for adding to the length of the followers of the respective hoops whenever the cheese-curd requires to be very highly pressed or condensed within the hoops.

The setting up of the foot-block may be effected simultaneously with the running back of the power-screw, by simply attaching two hook-rods to the foot-piece, and extending these rods to the blank neck of the screw, and connecting them to the screw by a collar, which moves longitudinally with the screw, but does not turn with it.

To enable others skilled in the art to make and use my invention, I will proceed to describe one practical mode of constructing and using the same.

A A represent two vertical uprights or standards of a frame; B B B', three longitudinal timbers, tying these standards together. The timbers B B are placed apart, and chamfered off at their inner upper corners or edges, $a$ $a$, so as to form a concave open channel, as represented.

C is a foot-block, fitted to slide over the top central timber B' and between the timbers B B, as represented, being constructed with a tongue, $b$, and shoulders, $c$ $c$, in order to overhang the beams, and still extend down between them in a manner to be supported and guided at the same time. This foot-board is kept in any desired position on the beams by means of pins, D D', which pass through any pair of the holes E E' of the upper and lower beams, in the manner shown.

F is a power-screw, passed horizontally through an oblong hole, $d$, of the front upright, and through a nut, G, which is firmly attached to the inside of said upright by screw-bolts, which pass through slots $d'$ $d'$, as shown. The nut is made adjustable up and down, and when it is adjusted the screw can follow it, as the slots $d$ $d'$ $d'$ permit the same. This adjustment is desirable, in order to have the screw act upon the exact centre of the follower-board of the first hoop or cylinder, in which the curd is pressed, whether the hoop be small or large. The screw shown is adapted for being worked by hand-"spikes" or levers, but a crank might be employed, or gearing, as may be deemed necessary.

On one side of the frame a horizontal or inclined table, H, is to be provided, upon which the cheese-hoops, with or without cheeses in them, may be placed and manipulated.

If desirable or necessary, an adjustable holding-down bar may be applied to the two uprights, below the central timber B', so as to prevent the hoops springing up from their bed-timbers B B, or moving in any manner out of position.

I I$^1$ I$^2$ I$^3$ I$^4$ represent five firmly-bound cheese-hoops, open at both ends, set upon the timbers B B.

J J$^1$ J$^2$ J$^3$ J$^4$ are detachable bottoms, applied to each of these hoops, by means of hooks or any well-known and suitable fastenings.

K K$^1$ K$^2$ K$^3$ K$^4$ are followers or plungers, fitting neatly the interior of the respective hoops. These followers are, say, about one-third the length of the hoops, as illustrated.

In arranging the hoops and followers upon the timbers B B, the foot-board is set back, as shown in fig. 1, and the screw, with its follower-board, is also run back to near the nut. The filled or partially-filled hoops, lined with canvas and filled with curd, are rolled into the trough of the beams B B, and the boards or bottoms J J$^1$ J$^2$ J$^3$ J$^4$ firmly hooked or fastened. The respective followers K K$^1$ K$^2$ K$^3$ K$^4$ are now adjusted, so as to enter the front end of the respective hoops, and as fast as adjusted the bottom of one hoop is pressed or forced up against the outer end of the follower of another hoop. All the followers being properly arranged, the screw-power is applied, and the curd in the several hoops pressed at the same time.

If the curd should be light or very porous, and the followers should all go "home" at one operation of "running out" the screw, the hoops may be set apart after having been drawn toward the screw, and other short followers interposed between the main followers and the bottoms of the hoops, and then a second running out of the screw performed. But, should the followers be made quite long, and the screw should be run out before they are forced home, it is only necessary to run back the screw, set forward the hoops and foot-board, and again repeat the running out of the screw.

In order to retain the followers in a central line at the first insertion of them into the hoops, spring-catches are to be applied at the entrances of the hoops. These catches, being bevelled, will admit the follower, bind slightly upon it, and, when the follower is forced home, they will spring out behind the follower and retain it within the hoop even when the hoops are separated. The main object of these hooks is to perform the last result, to wit, retain the followers in place after the pressing is done, but they will also serve to centre and hold the follower while being adjusted.

With my press a very large amount of work can be done with the same screw, and at one operation, and thus much delay and inconvenience avoided.

When the cheeses become set and ready for removal, there is nothing more easy than to roll them separately out of their bed upon the table, where they can be removed from their hoops.

In fig. 1 of the drawings, the screw is represented as having been partly run out; the followers being shown as only partly forced home.

In fig. 2 the screw is represented as fully run out, and the followers as still not forced home.

In fig. 3 the foot-block and cheese-hoops are shown as having been moved forward, and the screw is shown as partly run out, having been run back and again started forward. The followers are now "home."

My invention is particularly adapted for factory use, pressing a gang of cheeses with one power, doing it effectually, and saving an immense expense, and taking up much less room.

There are factories which make over a ton of cheese per day, and press the same by using thirty cheese-screws, each costing eight or ten dollars, making the presses cost, for one day's pressing, between three and four hundred dollars, and double that for pressing two days, which length of pressing is recommended by most good cheese-makers.

By my plan, thirty cheeses may be pressed one day at an expense for presses of thirty dollars, or two days at an expense of sixty dollars, without half the labor and attention being necessary to keep the cheese pressing by the single-screw presses in use, and withal the pressing is more uniform upon a series of cheeses.

By my plan a weight might be attached to the lever of the screw, and the lever with weight adjusted, so that when set free, a continuous gradual pressing obtained, whereas, by the present mode, the pressing can only be done by hand.

The gang-screw press heretofore used consists of a series of hoops with followers placed alongside one another. My arrangement of the followers all in the same line renders gang-presses still more desirable, as great power is obtained and great economy in room effected.

I do not claim the principle of applying pressure at one point, and transmitting the same throughout a series of pressing-followers at one time and by the same power, but What I do claim as my invention, and desire to secure by Letters Patent, is—

1. The employment of a series of separated hoops, in combination with a series of removable bottoms J J$^1$ J$^2$ J$^3$ J$^4$, a series of removable followers, K K$^1$ K$^2$ K$^3$ K$^4$, and a screw or other press, the devices named being applied within and upon a frame, A, B B B', or any equivalent frame, all substantially as and for the purpose described.

2. The combination of an adjustable piece, C, with said cheese-hoops, their bottoms and their followers, and with the screw or other well-known pressing-device, and with a suitable frame, A, B B B', substantially as and for the purpose specified.

3. The combination of the adjustable nut G with the cheese-hoops, their bottoms, their followers, and with the screw F, substantially as and for the purpose described.

MILTON B. FRASER.

Witnesses:
SAUL U. MILLER,
SEYMOUR JONES.